United States Patent [19]

Hesler

[11] 4,319,678

[45] Mar. 16, 1982

[54] MANURE CONVEYING SCRAPER APPARATUS

[75] Inventor: Andrew B. Hesler, Waterloo, Iowa

[73] Assignee: Farmstead Industries, Division of Farmhand, Inc., Waterloo, Iowa

[21] Appl. No.: 122,858

[22] Filed: Feb. 20, 1980

[51] Int. Cl.³ .............................................. B65G 25/10
[52] U.S. Cl. ..................................... 198/746; 198/748
[58] Field of Search ............ 198/748, 749, 746, 743.4, 198/814; 15/93 R, 93 A, 93 B, 93 C; 254/299–305, 309, 317

[56] References Cited

U.S. PATENT DOCUMENTS

| | | | |
|---|---|---|---|
| 2,221,585 | 11/1940 | Klein et al. | 74/242.11 |
| 2,552,743 | 3/1951 | Simpson | 198/748 |
| 2,675,121 | 4/1954 | Miller | 198/746 |
| 2,712,919 | 7/1955 | Calvent | 254/173 |
| 2,790,537 | 4/1957 | Howe et al. | 198/746 |
| 2,920,753 | 1/1960 | Wenger | 198/746 |
| 3,100,043 | 8/1963 | Cordis | 198/746 |
| 3,240,323 | 3/1966 | Kitson | 254/300 X |
| 3,530,832 | 9/1970 | De Setnick | 119/22 |
| 3,641,830 | 2/1972 | Stofer | 74/242.6 |
| 3,693,782 | 6/1912 | Thoennes | 119/28 X |
| 3,860,109 | 1/1975 | Benzmiller | 254/175 X |
| 3,978,737 | 9/1976 | Bailey | 74/242.11 |

Primary Examiner—Joseph E. Valenza
Assistant Examiner—Douglas D. Watts
Attorney, Agent, or Firm—Henderson & Sturm

[57] ABSTRACT

A scraper assembly is connected at a forward and rearward end to a cable driven by a reversible double drum cable drive. The scraper assembly includes a scraper blade pivotally connected to a shaft secured at each end to a shoe, or runner. A strut extends forwardly and rearwardly from each shoe terminating in centrally disposed front and rear guide members. A drive linkage, connected at forward and rearward ends to the cable, is pivotally connected to the blade and has front and rear slide members which are slideably received within the front and rear guide members, respectively. The slide members have stops at their ends defining a limited range of sliding movement between the guide members and the drive linkage. The sliding movement of the slides in the guides pivots the scraper blade, with the slide stops transmitting a drive force to the guides at the end of the slide travel to move the blade forwardly or rearwardly. The drive unit has a motor which reversibly rotates the cable drums through a gearbox, sprockets and endless chains. The motor is controlled by an electrical control mechanism which includes a forward sensor to stop and reverse the motor when the scraper reaches the front of the manure collection alley; and a rearward sensor to stop the motor and start a timer when the scraper reaches the rear of the manure collection alley. The timer is adjustable and reactivates the forward drive of the motor after a set period of time. The cable is routed from the drive unit to the scraper assembly through a cable course defined by pulley blocks. An adjustable tensioning means, including a tension indicator, applies a continuous positive tension to the cable.

12 Claims, 14 Drawing Figures

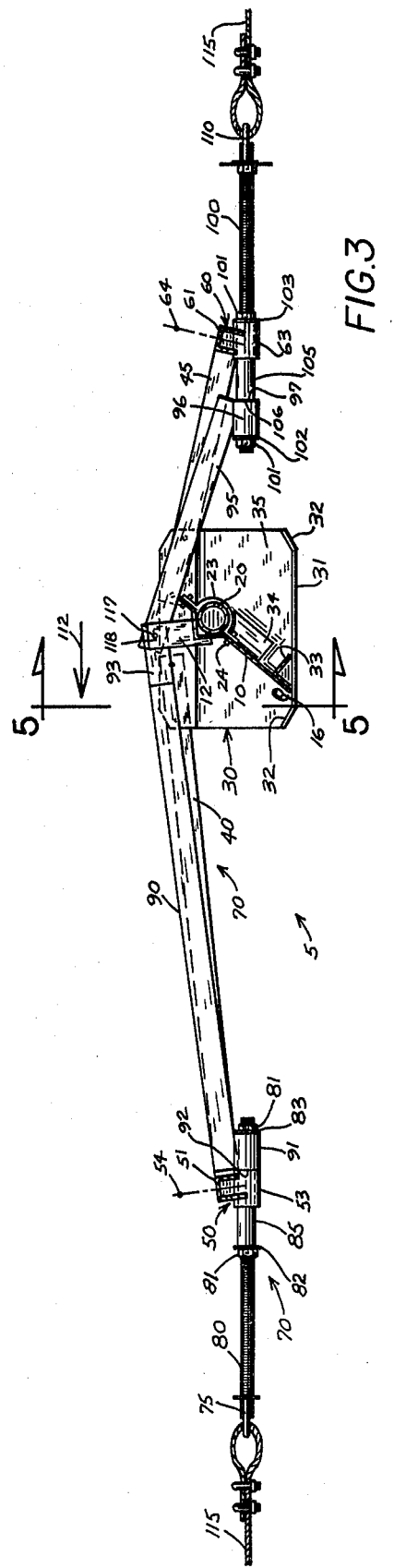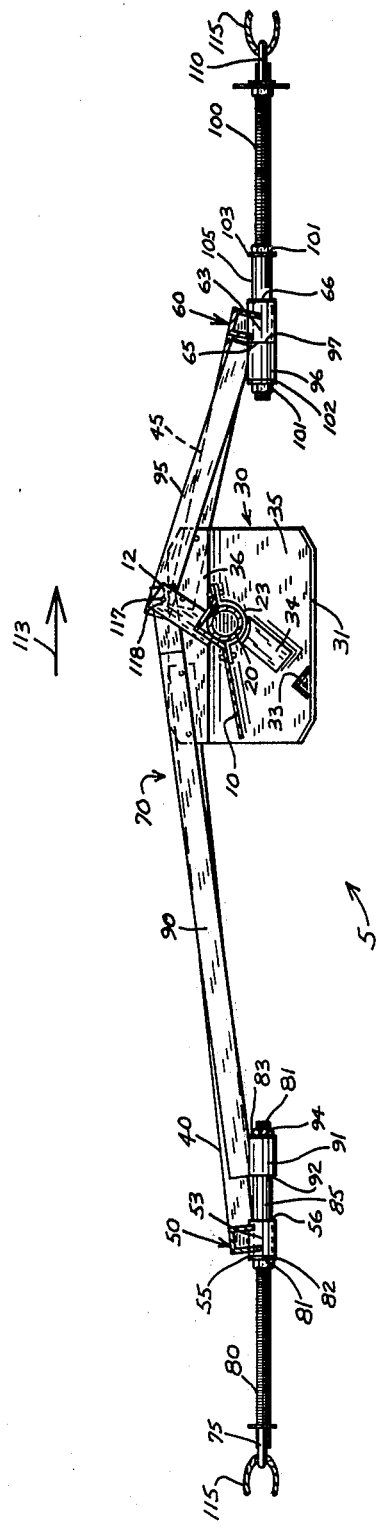

MANURE CONVEYING SCRAPER APPARATUS

BACKGROUND OF THE INVENTION

The present invention relates to the field of material conveyor systems, and more particularly, to manure conveying systems and apparatus located beneath the slatted floors of livestock confinement units.

Some of the prior art inventions employ scraper blades which are moved down a manure collection alley to convey manure out from under the building, and a few of these have employed a pivoting scraper blade. Examples of these are U.S. Pat. Nos. 3,530,832; 3,240,323; 2,790,537; and 2,920,753. Other, less pertinent, prior art is disclosed in U.S. Pat. Nos. 3,693,782 (Col. 3, Lines 23-35); 2,552,743; 2,675,121; and 3,860,109. A common shortcoming of these prior structures, however, is their failure to prevent the forward movement of the blade while it is being pivoted down; with the result that the blade does not remove the first few feet of manure in the alley.

The applicant's structure eliminates this shortcoming by providing a scraper assembly which ensures that the scraper is not moved forwardly until it has been pivoted downward to its full operating position. The applicant accomplishes this result by employing a truely novel slack mechanism which permits the drive linkage to slide through guide members attached to the scraper blade within a limited range of travel. This mechanism also ensures that the scraper is not moved rearwardly until it has been fully pivoted upward to its resting position. Thus, the present invention ensures that the collection alley is fully cleared of manure after each pass, and also that the blade does not drag any manure back down the alley on its return. Another novel feature of the scraper assembly is the securement of the drive linkage at a point slightly offset from the center of the blade which causes the blade to waiver as it moves down the alley resulting in a more even distribution of the manure along the blade. The strut arrangement of the instant scraper assembly discloses further novelty by ensuring that a downward force is continually applied to the blade.

The present invention also employs a novel cable tensioning mechanism to ensure that a positive tension is continuously applied to the cable so that it is not permitted to slacken and slip at the drive unit, or become entangled. While various tensioning mechanisms have been disclosed in the prior art (particularly in U.S. Pat. Nos. 2,221,585; 3,978,737; 3,641,830; and 2,712,919), all of them employ a moveable tensioning shaft rather than a fixed shaft with a moveable tensioning sleeve as employed by the applicant. The applicant's tensioning structure is superior for large cable applications such as the present one in that the moveable sleeve can very securely hold the tensioning pulley while being moveably, but securely, mounted to a fixed base member. The instant tensioning means further includes a novel tension adjustment and indicating means which permits the user to set the cable tension in the system.

SUMMARY OF THE INVENTION

The present invention includes a scraper blade which is pivotally secured to a shaft rigidly secured at each end to a shoe, or runner. Struts project rearwardly and forwardly from each shoe terminating in centrally disposed guide members. A drive linkage is slideably received within these front and rear guide members and is pivotally attached to the scraper blade. The drive linkage has front and rear slide portions which slideably move within the front and rear guides, respectively, within a limited range of travel defined by stops secured at the ends of each slide. While the slides are moving forwardly within the guides, the blade is pivoted downward to its operating position. The continued forward movement of the drive linkage causes the slide stops to contact the guide members, terminating the forward sliding movement of the slides, and causing the scraper assembly to move forward due to the force applied from the drive linkage through the stops to the guides; that driving force being transmitted from the guides through the struts to the shoes which are moved forwardly, in turn, moving the pivotally secured scraper blade forwardly. Thus, the scraper assembly linkage ensures that the scraper blade is not moved forwardly until the blade has been pivoted downward to its full operating position.

The operating of the scraper assembly is analogous when the drive linkage reverses direction with the scraper blade being pivoted fully upward to its resting position before being moved rearwardly.

The drive linkage is connected at each end to a cable which is wrapped around a double drum reversible drive unit. The drive unit is controlled by an electrical control mechanism which includes a forward sensor which signals the control mechanism to stop and reverse the drive unit when the scraper assembly reaches the front of the manure collection alley. A rearward sensor then signals the control mechanism to stop the drive unit when the scraper reaches the rear of the alley, and to start a timer which reactivates the forward drive of the drive unit after a period of time set by the user.

The drive unit includes a torque limiting slip clutch which prevents an overtorque from entering the motor of the drive unit should an excessive torque be applied to the drums through the cable such as could occur if the scraper were blocked. The clutch, thus, protects the drive unit from overtorque failure and ensures that the cable will not be overloaded, and thereby, snapped. As a second safety mechanism, a safety relay in the control box cuts off the power when the motor draws an excessive current such as would result in the overload situation. The cable is routed from the drive unit to the scraper assembly through a cable course defined by pulley blocks.

A cable tensioning mechanism applies a continuous tension force to the cable to ensure that it does not slacken under any system condition such as when the system switches drive modes. The tensioning mechanism includes a tension adjustment and indicating means which permits the user to set the cable tension in the system as desired.

It is therefore an object of the present invention to provide a novel scraper assembly which ensures that the scraper is not moved forwardly or rearwardly until it has been pivoted to its full upward or full downward position, respectively.

It is a further object of the present invention to provide strut/guide assembly which causes the blade to waiver slightly as it is towed down the collection alley effecting a more even distribution of the manure across the blade.

It is another object of the present invention to provide an automatic manure conveying system for use with livestock confinement units.

Still another object of the present invention is the provision of a novel tensioning device which is superior for large cable applications, and which is adjustable and includes a tension indicator to enable the user to set the cable tension in the system.

A still further object of the present invention is the provision of a reversible double drum drive unit which includes a limiter on the cable tension to prevent system falure, and to protect the user from an overload on the cable.

These and other objects, advantages, and novel features of the present invention will become obvious from the following detailed description of the invention taken in conjunction with the accompanying drawings.

BRIEF DESCRIPTION OF THE DRAWINGS

FIG. 3 is a cross-sectional elevational view of a scraper assembly taken along line 3—3 of FIG. 2.

FIG. 4 is a cross-sectional elevational view similar to FIG. 3 showing the scraper blade in its resting position.

DESCRIPTION OF THE PREFERRED EMBODIMENT

The manure conveying system comprising the present invention is for use in conveying manure from beneath the floor of a livestock confinement unit. The floors of such units typically are of a slat construction permitting the manure to pass through the slats and into manure trenches formed in the foundation below the floor. Such trenches, or manure collection alleys, run generally parallel to one another with a scraper blade periodically passing down the alley to convey any accumulated manure to a manure collection ditch at the end of the alley.

FIGS. 1-13 disclose one alley, two alley and three alley conveyor systems. It will be obvious from the following description, however, that the system comprising the present invention could be employed for use with any number of collection alleys.

Figure 1:
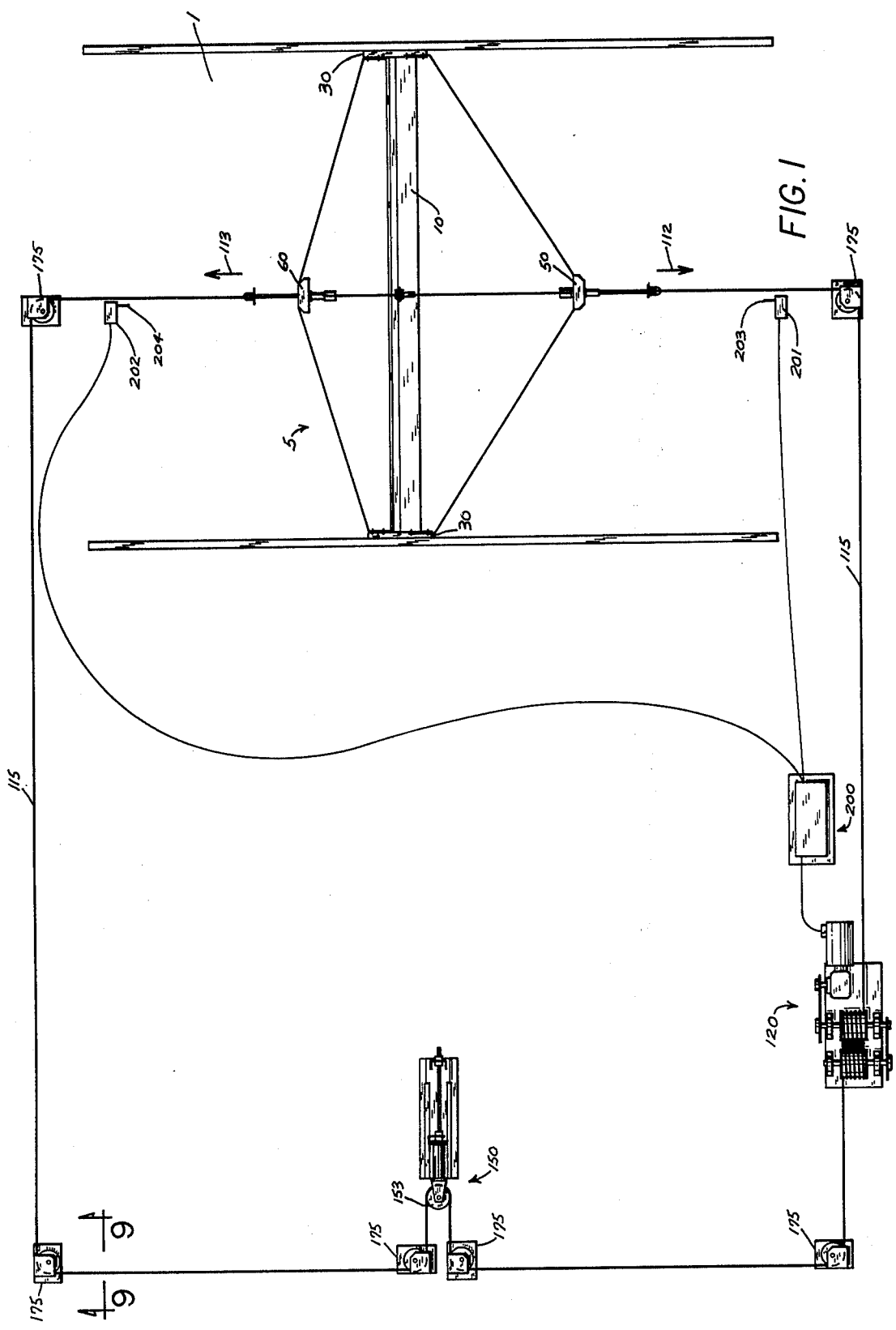
FIG. 1 is a plan view of overall manure conveyor system.

As a brief overview, with reference to FIG. 1, the instant conveyor system is comprised of three principal components: a scraper assembly 5, a reversible drive unit 120, and a cable tensioning means 150. As shown in FIG. 1, the scraper 5 extends transversely across a collection alley 1 and is moveable lengthwise in either the forward or rearward direction along the alley 1 by means of a cable 115 which is driven by the reversible drive unit 120. The cable 115 follows a course determined by the pulley blocks 175, as shown, with the cable tensioning means 150 ensuring that the cable 115 remains under a continuous positive cable tensioning force as will later be described.

Figure 2:
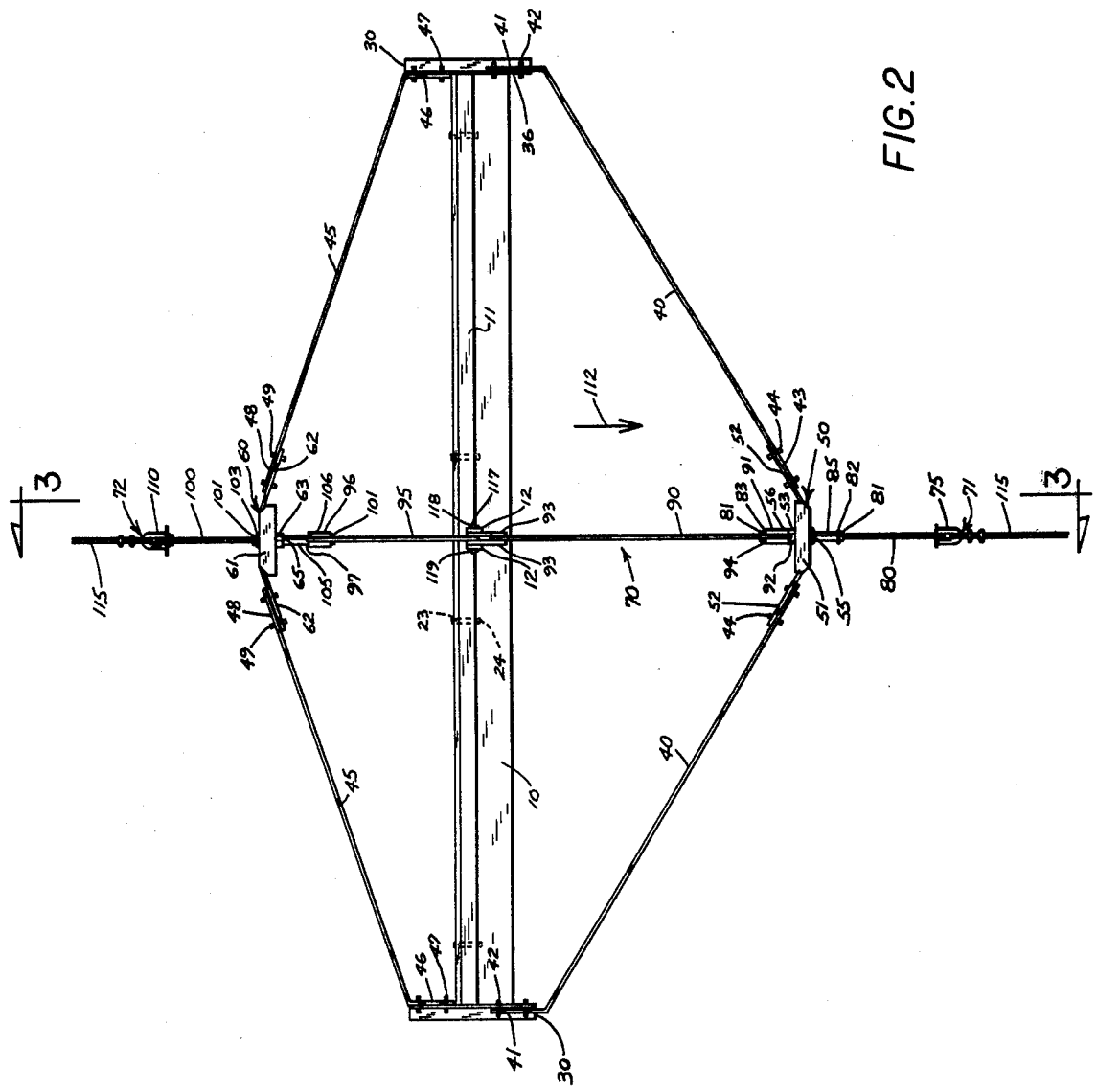
FIG. 2 is a plan view of the scraper assembly with the scraper blade in the operational position.

Now, more particularly, with reference to FIGS. 2, 3 and 4, the scraper assembly 5 is comprised as follows:

The scraper blade 10 is pivotally attached to the transverse axis shaft 20 by means of semicircular brackets 23, and nuts and bolts 24. Bolts 24 are received in suitable apertures (not shown) in the blade 10. The shaft 20 is received within an angled depression 11 of blade 10 by the brackets 23. The closure area created by the brackets 23 and the angled depression 11 provides sufficient clearance about the shaft 20 so that the blade 10 can pivot freely thereabout. A pair of spaced tabs 12 depend substantially normally from the exterior of angled depression 11 as shown in FIG. 3. The tabs 12 are disposed in a slightly offset position, here approximately ¼ inch to the right of center, and they cooperate with link members 90 and 95 as will later be described. Blade 10 also includes extended end portions 13 which cooperate with the shoes 30 (later described). See FIG. 5.

Blade 10 is supported both by transverse axis shaft 20 and shoes 30. The shaft 20 is rigidly secured at its ends to the shoes 30.

Figure 5:
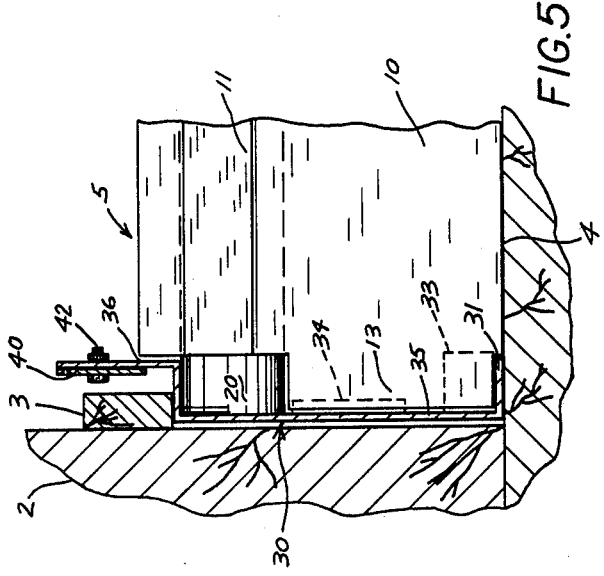
FIG. 5 is a partial elevational view taken along line 5—5 of FIG. 3 of one end of the scraper assembly.
Figure 8:
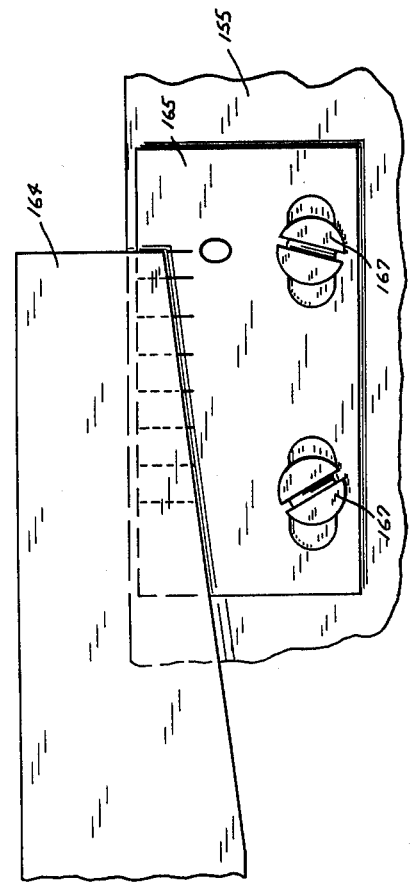
FIG. 8 is an elevational detail view of the tension indicating means taken along line 8—8 of FIG. 7.

The shoes 30 best seen in FIGS. 3-5, have a broad face 35 which is disposed normally with respect to blade 10 and shaft 20. The shoes 30 are positioned at opposite edges of the collection alley 1 so that the blade 10 extends substantially across the alley 1. Each shoe 30 has a runner portion 31 disposed inward, normally from the lower edge of broad face 35. See FIG. 5. The runners 31 have upwardly formed end portions 32 which facilitate smooth unimpaired movement of the shoes 30 along the manure alley 1. An angled stop 33 is secured upon the upperside of each runner 31 to provide support for the blade 10 while it is in the normal operating position shown in FIG. 3. An edge stop piece 34 is supported upon the broad face 35 of shoe 30 in allignment with the angled stop 33, as shown in FIG. 3, to provide further support for the blade 10. Depending inward, normally from the upper edge are guide members 36. Guide 36 provides clearance for the struts 40, 50 and securing bolts 42 (later described), and cooperates with the rail 3 which is rigidly secured to alley boundry wall 2 to hold the shoes 30 down should the scraper assembly 5 begin to ride up and over manure. With reference to FIG. 5, it is noted that the lower edge of blade 10 is supported by the shoes 30 just above the surface of alley floor 4. This clearance permits a thin layer of manure to remain in the alley and serve as a lubricant while passing beneath the blade. This lubricating action reduces friction and thereby decreases the force necessary to move the scraper.

The scraper blade 10 is shown in its operating position in FIG. 3. In this position, the blade has a pitch angle 15. The applicant has found that a pitch angle 15 of 49° is generally optimal. Holding the pitch 15 at approximately 49° permits the manure to climb up the blade 10 somewhat and thereby apply a weight to the top of the scraper 10, holding it down. In addition, this angle tends to push the solids to the front of the conveyed mass, leaving the more liquid matter to the rear where it can swirl about, or eddy 16, at the lower edge of the blade, providing a sort of cleansing action as the blade moves along. This pitch angle can be adjusted, however, as will later be described.

The shoes 30 support front stabilizer struts 40, and rear stabilizer struts 45. The struts 40 in turn support front guide member 50, while the struts 45 support rear guide member 60. The guide members 50 and 60 support the drive linkage assembly 70 in a manner later described.

Front stabilizer struts 40 have deformed rearward ends 41 having apertures (not shown) for securement to the shoes 30 at guide portions 36 by means of nuts and bolts 42. The forward ends 43 have apertures (not shown) for securement to the front guide member 50. The struts 40 are angled downwardly from the shoes 30 to the guide member 50.

Front guide member 50 includes a central base block 51 having a pair of wing members 52 extending outwardly at its ends to align with the struts 40. Wing members 52 have apertures (not shown) for securement to the forward ends 43 of struts 40 by means of nuts and bolts 44. Guide member 50 is completed by guide collar 53 which is rigidly secured to the lower side of base block 51. See FIG. 3. Collar 53 is oriented somewhat obtusely with respect to the center line 54 of base block 51 as shown in FIG. 3. The obtuse orientation of collar 53 permits alignment of the collar 53 in the drive linkage assembly 70, later described. Guide collar 53 is cylindrical having an inside diameter dimensioned to receive front slide member 80 in a sliding relationship as will be later described more fully.

The assembling of rear struts 45 to the shoes 30 and rear guide member 60 is directly analogous to the strut/guide assembly described above. The deformed forward ends 46 of the struts 45 are secured to the shoes 30 at guide members 36 by means of nuts and bolts 47 through apertures (not shown). The downwardly directed rearward ends 48 of the struts 45 are secured to the wings 62 of guide member 60 by means of nuts and bolts 49 through apertures (not shown). The wings 62 extend outwardly from the ends of base block 61 and a guide collar 63 is secured to the underside of block 61 in a somewhat obtuse orientation with respect to the centerline 64 of the block 61 to permit proper alignment of the drive linkage assembly 70, later described. The rear guide collar 63 is cylindrical, having an inside diameter dimensioned to slideably receive the slide portion 105 of the drive linkage 70.

The drive linkage assembly 70 has a front end 71 and a rear end 72, and is principally comprised of a front eyelet 75, front threaded shaft 80, front slide member 85, front link member 90, link pin 117, rear link member 95, rear threaded shaft 100, rear slide member 105, and rear eyelet 110.

The linkage assembly 70 is connected to the cable 115 at front eyelet 75 and rear eyelet 110. The assembly 70, under the force of cable 115, pivots the blade 10 downward to its operating position and moves the blade forward, and when the direction of cable 115 reverses, pivots the blade upward to its resting position and moves the blade rearwardly, as will become apparent.

Front eyelet 75 is rigidly secured to front threaded shaft 80 by means of suitable nuts threadably received on the shaft 80 (not shown). Threaded shaft 80 extends rearwardly through the hollow interior of front slide member 85. The rearward portion of slide member 85 is received within the hollow interior of collar 91 and these members are rigidly secured together such as by welding. Nuts 81 are threadably engaged with the shaft 80 to secure washers 82, 83 at the ends of slide member 85, and thereby secure the slide 85 upon the threaded shaft 80.

Slide 85 is suitably dimensioned in outside diameter to be slideably received within the guide collar 53 of front guide member 50. A lubricant is disposed between the guide collar 53 and slide 85 to minimize friction and facilitate the sliding movement of the slide 85 within the guide collar 53. The range of travel of slide 85 within the guide collar 53 is defined by the washer, or forward stop 82, and the front shoulder portion of collar 91 which comprises rear stop 92. Thus, the slide 85 can move forwardly until the rear stop 92 contacts the rearward face 56 of front guide collar 53 as shown in FIG. 2. Slide 85 can move rearwardly until front stop 82 contacts the forward face 55 of guide collar 53 as shown in FIG. 4. It can, therefore, be appreciated that front stop 82 and rear stop 92 comprise a travel limiting means for front slide 85 within front guide collar 53.

Cylindrical collar 91 is rigidly secured to the underside of the forward end of front link member 90 in a somewhat obtuse orientation as shown in FIG. 4. This obtuse orientation permits collar 91 to be secured upon, and in alignment with, the front threaded shaft 80, and also applies a downward force to the blade 10. Front link member 90 is directed upward, rearwardly from collar 91 to the pivotal connection of its rearward end with the scraper blade 10 and rear link member 95. The rearward end of front link member 90 comprises a forked end, having an outwardly disposed pair of spaced tabs 93. Tabs 93 are suitably spaced in exterior dimension to be received within the upstanding tabs 12 of the scraper blade 10. Tabs 93, in addition, provide for an interior space to receive the forward end of rear link member 95 (later described). Each of the upstanding tabs 12 and tabs 93, and the forward end of link member 95 have suitable apertures aligned to receive a link pin 117. See FIG. 2. Link pin 117 has a broad head 118 and at the end opposite thereto a threaded portion (not shown). The threaded portion is suitable for threadably receiving link nut 119 to secure the pin 117 within the aligned apertures, thereby permitting a three-way pivotal connection between front link member 90, rear link member 95, and scraper blade 10.

Rear link member 95 extends rearward, downwardly from its forward end, having rear cylindrical collar 96 rigidly secured to the underside of its rearward end in a somewhat obtuse orientation as shown in FIGS. 3 and 4. Collar 96 has a hollow interior suitably dimensioned to receive the forward portion of slide member 105. Rear slide member 105 is cylindrical, having threaded shaft 100 extending throughout its hollow interior. Cylindrical collar 96 and slide 105 are rigidly secured together such as by welding. Slide member 105 is rigidly secured along the shaft 100 by means of nuts 101 threadably received on shaft 100 and washers 102, 103.

Slide 105 is slideably received within guide collar 63 of rear guide member 60. Rear washer 103 comprises a rear stop, and the rearward face 97 of collar 96 comprises a forward stop, defining the range of travel of slide 105 within guide collar 63. Rear stop 103 and forward stop 97 thereby comprise a travel limiting means for the rear slide member 105 within the rear guide collar 63.

Rear threaded shaft 100, thence, extends rearwardly to rear eyelet 110 which is rigidly secured by suitable nuts (not shown) to the rearward end of the threaded shaft 100.

Cable 115 is secured to the forward eyelet 75 and the rear eyelet 110 of the drive assembly 70. As has been noted briefly above, and will be described in more detail below, cable 115 is driven by a reversible drive unit 120 and is maintained under a continuous positive tension by tensioning means 150. The path of cable 115 is determined by the pulley blocks 175. See FIG. 1. Drive unit 120 can drive the cable in a forward direction indicated by arrow 112, and reverse to drive the cable in a rearward direction indicated by arrow 113.

The operation of the scraper blade 10 and associated linkage is as follows:

FIG. 4 shows the scraper assembly 5 in the position it would assume after having been pulled to the rearward end of the collection alley 1 under the reverse drive of drive unit 120, and just before unit 120 reverses into forward drive. Under reverse drive, the cable 115 has pivoted the blade 10 upwardly to the resting position, and pulled the scraper assembly 5 rearwardly by the force of the forward stop 97 on the forward face 65 of the rear guide member 60, and also by means of the force applied by the forward stop 82 on the forward face 55 of the forward guide member 50.

When drive unit 120 reverses to drive the cable 115 in the forward direction 112, both the front slide member 85 and the rear slide member 105 will slide through their respective guide collars 53, 63 until their respective rearward stops 92, 103 contact the respective rearward faces 56, 66 of the guide members 50, 60. The sliding travel of the slides 85, 105 within the guides 50, 60 pivots the scraper blade 10 from the resting position of FIG. 4 to the operating position of FIG. 3.

The instant scraper assembly 5 is designed to ensure that the blade 10 reaches its full downward, operating position at the same time that the rearward stops 92, 103 contact the guide members 50, 60. This cooperation of elements is accomplished by providing a slide travel just suitable to pivot the blade 10 through the range of angular movement defined by the resting and operating positions described. Given the novel configuration of elements herein disclosed for the drive assembly 5, providing the range of slide travel necessary to accomplish the above purpose would be obvious to one skilled in the art.

With the blade 10 reaching its downward position at the same time that the stops 92, 103 contact the guide members 50, 60, an important improvement over the state of the art is achieved: Namely, the scraper blade 10 of the scraper assembly 5 is not moved forwardly until the blade 10 has been pivoted downward to its full operating position. This feature avoids the shortcomings of the prior art wherein the blade is moved forward while being pivoted downward, thereby failing to remove the manure deposited at the beginning of the collection alley.

It is perhaps most easy to understand the structure of the instant scraper assembly by considering the drive linkage 70 as one element, and the blade 10, transverse shaft 20, shoes 30, and struts 40, 45 with guides 50, 60 as a second element. All components of the drive unit 70 are continually under tension and are held in a fixed relation to one another except that forward link 90 and rearward link 95 pivot with respect to one another at their pivotal connection with the blade 10. The second element described above, the blade-shaft-shoes-struts-guides, can then be thought of as getting a "free ride" from the drive linkage assembly 70. The only connection between the two elements being the pivotal connection of the links to the blade; and the slide members, with their respective forward and rearward stops, sliding within a limited range of travel in the guide members.

Once the blade 10 has been pivoted to its operating position of FIG. 3, the rearward stops 83, 103 apply a forward force to the guide members 50, 70, respectively, which causes the entire scraper assembly 5 to move forward. FIG. 2 also shows the blade 10 in its operating position and moving forward.

Once the scraper assembly 5 reaches the forward end of the collection alley, a forward sensor 201 is engaged (see FIG. 1) which signals to motor 120 to reverse direction (later described more fully). Motor 120 switches into reverse drive and the blade is pivoted from the operating position of FIG. 3 to the resting position of FIG. 4 as slide members 85, 105 slide rearwardly from the engagement of their rearward stops 92, 103, respectively, with the guides 50, 60, to the engagement of their forward stops 82, 97, with the guides 50, 60. Once the rearward stops 82, 97 engage, or contact, the guides 50, 60 the drive assembly 5 is moved rearwardly by the force of the cable 115. Of course, inasmuch as the blade 10 is pivoted upward and thereby elevated off of the surface of collection alley 1 on its return travel, it does not drag manure back along the alley but rides above the same.

It was noted above the drive linkage 70 was secured slightly to the right of the center of blade 10. The effect of this is to cause the right side of the blade 10 to be first pulled slightly forward, and for the blade to then straighten out due to the tension in the drive linkage 70. The blade 10, thus, walks or waivers slightly as it travels down the alley 1 which effects a more even distribution of the manure across the blade.

Note that the downward orientation of the struts 40, 45 from the shoes 30 to their respective guide members 50, 60, effects a downward force on the blade 10.

The scraper assembly 5, in addition, permits the upward adjustment of the pitch angle 15 of the blade 10. To increase pitch angle 15, the nuts 81, 101 are simultaneously moved rearwardly which moves the slides 85, 105 rearwardly along the threaded shafts 80, 100, respectively. The user can, thus, increase the pitch angle 15 to raise blade 10 if necessary to avoid a bump in the alley 1.

Having disclosed, in detail, the structure and operation of the scraper assembly 5, the remaining components of the instant manure disposal system can now be more easily understood. Briefly, they comprise a double drum reversible drive unit 120 around which the cable 115 is wound; a number of pulley blocks 175, which define the course of the cable 115; a cable tensioning means 150; and a control mechanism 200.

Figure 6:
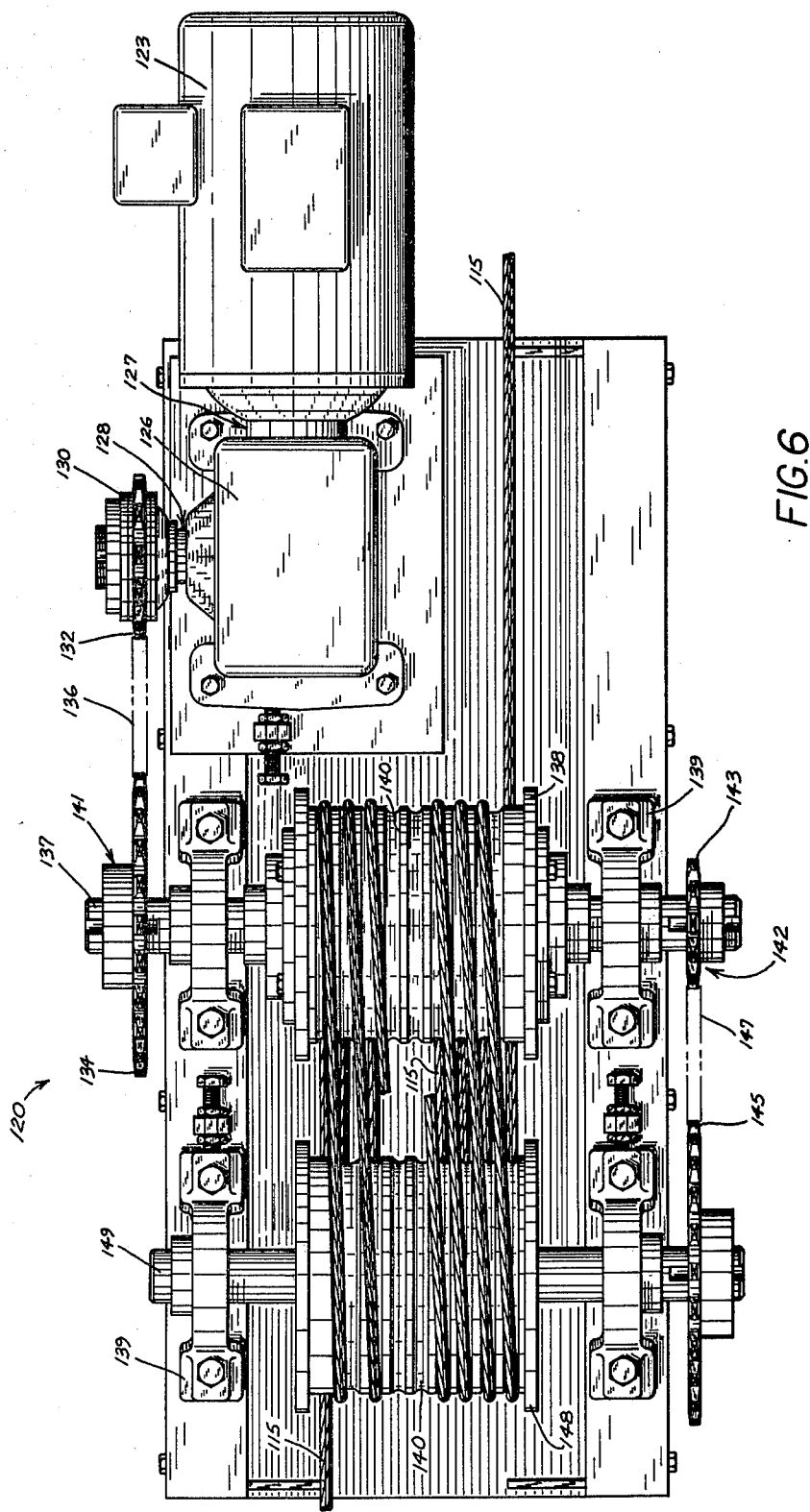
FIG. 6 is a plan view of the reversible drive unit with portions of the cable broken away for clarity.

The double drum reversible drive unit 120, shown in FIG. 6, is powered by a reversible electric motor 123. Motor 123 is coupled with a gearbox 126 by means of gearbox input shaft 127. Gearbox 126 has an output shaft 128 operatively connected to a torque limiting clutch 130. A first sprocket 132, secured to the clutch 130, is in operable connection with a second sprocket 134 by means of a first endless chain 136. The sprocket 134 is secured to one end of a clutch shaft 137 which rotationally supports idler drum 138. At the opposite end of clutch shaft 137 a third sprocket 143 is secured. The shaft 137 is supported by suitable bearings 139. Sprocket 143 is operably connected to a fourth sprocket 145 by means of a second endless chain 147. Sprocket 145 is secured to one end of drive spool shaft 149 which rotationally supports drive spool 148. Shaft 149 is supported for rotational movement by suitable bearings 139.

The idler drum 138 and the drive drum 148 have a plurality of encircling grooves 140. Cable 115, attached to the front eyelet 75 of the scraper assembly 5, is shown in FIG. 6 coming in from the right, passing beneath both drums 138, 148, and then being wrapped from the grooves 140 of the drive drum 148 to the corresponding grooves 140 of the idler drum 138. This wrapping of the cable 115 from drum 138 to drum 148 continues along the length of the drums 138, 148; the cable 115 leaving the bottom of drum 138, passing underneath drum 148 and extending out to the left in FIG. 6. The cable 115 is then run through the pulleys and cable tensioning device 150, before being connected to the rear eyelet 110 of the scraper assembly 5.

The clutch shaft 137 is a shaft cooperating with a reversible drive clutch. Many means are available to perform as reversible clutches. Examples are shown in U.S. Pat. Nos. 295,446; 3,200,919; and 3,158,244. The principal characteristic of such reversible shaft clutches is that one side of the shaft clutch engages when rotated in one direction, and the other side of the shaft clutch engages when rotated in the opposite direction. In the present invention, shaft clutch 137 is designed such that when it is rotated clockwise, as viewed from the bottom of FIG. 6 towards the top, the end 142 of the clutch shaft 137 engages to drive third sprocket 143 which drives drive drum 148. When the shaft is then reversed to rotate counterclockwise, the end 141 of the shaft 137 engages to drive idler drum 138.

In operation, the reversible drive unit 120 functions as follows:

Motor 123 is energized to turn the input shaft 127 of the gearbox 126. This, in turn, powers the output shaft 126 of the gearbox 126 which rotates the first sprocket 132. The motor 123 is reversible, and let us assume in the first instance, that it has caused the sprocket 132 to move clockwise (viewing FIG. 6 from the bottom towards the top). The clockwise movement of first sprocket 132 causes the clockwise movement of the second sprocket 134 through the chain 136. This, in turn, causes the clockwise movement of shaft clutch 137 which engages at its end 142 to drive the third sprocket 143 clockwise. Sprocket 143 drives fourth sprocket 145 clockwise through chain 147, and fourth sprocket 145 rotates the drive drum 148 clockwise. The cable 115 is in tension in the grooves 140 of the drums 148, 138. The grooves 140 provide for high frictional contact with the cable 115 such that the clockwise rotation of the drum 148 pulls the cable 115 in from the right of FIG. 6, and thereby pulls the scraper assembly 5 forward in the collection alley 1. When rotated clockwise the drive drum 140 is driven by the engaged third sprocket 143 and is providing the driving force for the movement of cable 115 and the assembly 5. Idler drum 138 is also rotating clockwise but only due to its cable windings connection with drive drum 148; the drum 138 is idling in this clockwise mode.

When the motor 123 reverses direction and turns the first sprocket 132 counterclockwise, the shaft clutch 137 is correspondingly rotated counterclockwise, engaging at end 141, and driving the idler drum 138. The counterclockwise drive of drum 138 pulls cable 115 in from the left in FIG. 6, and pulls the scraper assembly 5 rearwardly in collection alley 1. In this counterclockwise mode, no drive power is transmitted to drive drum 148 via the sprocket 145 and the drum 148 is rotated counterclockwise due to its cable windings connection to idler drum 138. Drum 148, thus, idles in the counterclockwise mode.

Reversible drive unit 120 includes a torque limiting clutch 130 operatively connected to first sprocket 132 as a safety mechanism. If for some reason the scraper is blocked, the continued driving force of the unit 120 will increase the tension in cable 115. This increased tension will be transmitted by cable 115 through the drums 138, 148 to the second sprocket 134. Sprocket 134 will, in turn, transmit this overload to first sprocket 132, effecting an overload torque on the sprocket 132. This overload torque on sprocket 132 will be sensed by the torque limiting clutch 130 which will slip, partially disengaging sprocket 132, and preventing the excessive torquing force on sprocket 132 from entering the motor 123, or gearbox 126, and thereby protecting the same from overtorque damage. In addition, the clutch 130 serves as a tension limiter on cable 115, thereby improving safety by ensuring that cable 115 is not brought to a state of excessive tension where it could snap and flail about.

Reversible drive unit 120 is controlled by means of electrical control box 200. The control box 200 is weatherproof and protects the control mechanisms housed within from all environmental conditions. The control 200 is electrically connected to forward sensor 201, rearward sensor 202 and to motor 200. Control box 200 has a set of manually operable controls to move the scraper forward or rearward as well as a system of automatic controls. At startup, the motor 126 is manually energized at the control box 200 to move the scraper assembly 5 forward in the collection alley. At the forwardmost end of the collection alley, a forward sensor 201 having a sensing probe is secured, and likewise, at the rearward end a rearward sensor 202, having a sensing probe 204 is secured. When the assembly 5 reaches the front of the alley 1, the guide member 50 contacts the sensing probe 203 which signals the control mechanism 200 to stop and reverse the drive unit 120. This reversing of the drive unit 120 pivots the scraper blade 10 upward to its resting position and pulls the scraper assembly 5 rearward as aforedescribed. When the scraper assembly 5 reaches the rearward end of the alley 1, guide member 60 contacts sensing probe 204, and the rearward sensor 202 signals the control box 200 to stop the drive unit 120. The forward sensor 201 and the rearward sensor 202 would, of course, be located sufficiently in front of, or behind, respectively, the manured area of the collection alley 1 to permit the alley to be fully cleared of manure by the forward travel of the scraper assembly 5. Note also that a collection trench (not shown) would be provided at the front of the alley to receive the manure once it had been conveyed forwardly to the end of the alley. The manure could then be removed from this collection trench as necessary.

The control box 200 includes an adjustable timer mechanism. The timer mechanism would be activated once the rearward sensor 202 signaled control 200 to stop the motor 123. The timer could be set to automatically activate the motor 123 to move the scraper assembly 5 forwardly a set period of time after the rear sensor had been contacted. The time interval selected would, of course, depend on the number of animals housed over the collection alley.

The control mechanism described above would, thus, automatically activate the scraper 5, at the end of a set interval of time, to convey any accumulated manure to the collection trench at the end of the alley 1, returning the scraper assembly 5 to rearward end of the alley 1 at the end of each pass.

Control mechanism 200 also includes a system overload safety device. A safety relay 200 trips the system off when the motor 123 draws excessive current such as would be the case in an overload condition. Therefore, if slip clutch 130 is unsuccessful in preventing an overtorque from entering the motor 123, the excessive current required by motor 123 to drive the system will trip the safety relay shutting down the system.

Given the requirements set forth above for the electrical control system, various circuits, obvious to one skilled in the art, could be devised to function as described.

Figure 7:
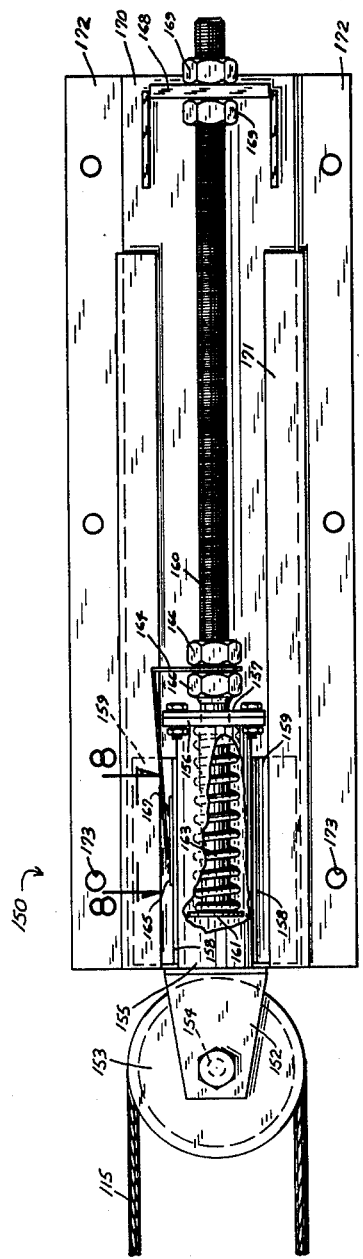
FIG. 7 is a plan view of the cable tensioning means showing hidden portions of the tensioning shaft and spring in dotted lines.

Also included in the instant conveyor system is a tensioning means 150 positioned as shown in FIG. 1. The cable 115 is threaded from the pulleys 175 to the tensioning pulley 153 as shown. The tensioning pulley 153 applies a resilient tensioning force on the cable 115. With reference to FIG. 7, tensioning pulley 153 is rotationally secured by the bearing pin 154 to the securement flanges 152. Securement flanges 152 sandwich the pulley 154, only the upper flange 152 being shown in FIG. 7. Bearing pin 154 is secured in alligned apertures (not shown) in the flanges 152.

The flanges 152 are secured, such as by welding, to the forward end of tensioning sleeve 155. Tensioning sleeve 155 has a hollow interior, with an aperture 157 centrally disposed through its rearward end. The sleeve 155 is supported by L-shaped angled flanges 158 which include rectangular slide portions 159 disposed outward normally from their lower portions to form the horizontal leg of the L. A tensioning shaft 160 is slideably received within the aperture 157, and has a broad, flat head 161 disposed at its forwardmost end. A spring 163 encircles the enclosed portion of the shaft 160 and is held in a state of compression between the head 161, and the inside surface 156 of the rearward end of sleeve 155. The rearward end of shaft 160 is threaded and is received in a suitable aperture (not shown) in the bracket 168, with the nuts 169 being threadably engaged with shaft 160 to secure the shaft 160 to bracket 168. Bracket 168 is rigidly secured to base member 170. Base member 170 includes slide channels 171 which provide horizontally disposed channels to receive the slides 159 of the tensioning sleeve 158. Slides 159 in cooperation with slide channels 171, thus, moveably mount the tensioning sleeve 155 upon the base 170. The base 170 is supported by feet 172. Feet 172 are L-shaped and elevate the base 170 above the ground surface or floor. Apertures 173 are provided in the feet 172 to secure the tensioning means 150 to its supporting surface.

The operation of the tensioning means is as follows: Spring 163 rests at its forward end on the head 161 of shaft 160 which is regidly fixed in position by bracket 168. The rearward end of the spring 163 rests on the spring bearing surface 156 of the sleeve 155. Sleeve 155 is moveable with respect to the rigidly secured shaft 160 by means of the sliding cooperation between apertures 157 and the shaft 160. Supporting flanges 158, having slides 159, cooperatively permit sliding movement between the fixed rigid base 170 and the sleeve 155 as aforedescribed. Hence, the sleeve 155 is slidably moveable both upon the fixed base 170 and with respect to the fixed shaft 160. Inasmuch as the spring 163 is under compression, it biases the sleeve 155 to the right in FIGS. 1 and 7, or rearwardly. To counteract this rearward bias and hold the assembly 150 in equilibrium, the cable 115 passes through tensioning pulley 153 which tends to pull the sleeve 155 to the left in FIGS. 1 and 7, or forwardly. It can thus be appreciated that the tensioning sleeve 155 will ride back and forth along the base 170 as the tension in cable 115 varies, and that the pulley 153 provides a positive tensioning force upon the cable 115 to prevent slack under all conditions of operation.

It is observed with regard to the inherent structure of the instant tensioning means 150, as disclosed, that the nuts 169 and bracket 168 comprise a tension adjusting means. To vary the state of compression of the spring 163, and thus, the tensioning force of the apparatus, the securing nuts 169 can be moved forwardly or rearwardly along the threaded portion of the shaft 160. For example, by retracting the shaft 160 rearwardly through the bracket 168, the tensioning force is increased.

In conjunction with the tension varying means, a tension indicating means comprised of pointer 164, scale 165, nuts 166 and screws 167 is provided. Nuts 166 secure one end of the pointer 164 to the shaft 160. The opposite end of the L-shaped pointer 164 cooperates with a scale 165, affixed to the sleeve 155 by means of screws 167. See FIG. 8. As the shaft 160 is retracted through the bracket 168, spring 163 is put into a greater state of compression, and the pointer 164 is moved rearwardly, or to the left in FIG. 8, across the scale 165 to indicate the increase in tension in the cable 115. Given a spring with a specified spring factor, the scale can be calibrated to indicate its degree of compression and the resultant tensioning force. The tension indicating means disclosed, thus, permits the user to set the tension of the cable in the system according to the manufacturer's instructions, accounting for different types of cabels, different loads on the system, and other variables.

To complete the instant conveyor system a brief description of the pulleys 175 is now provided.

Figure 10:
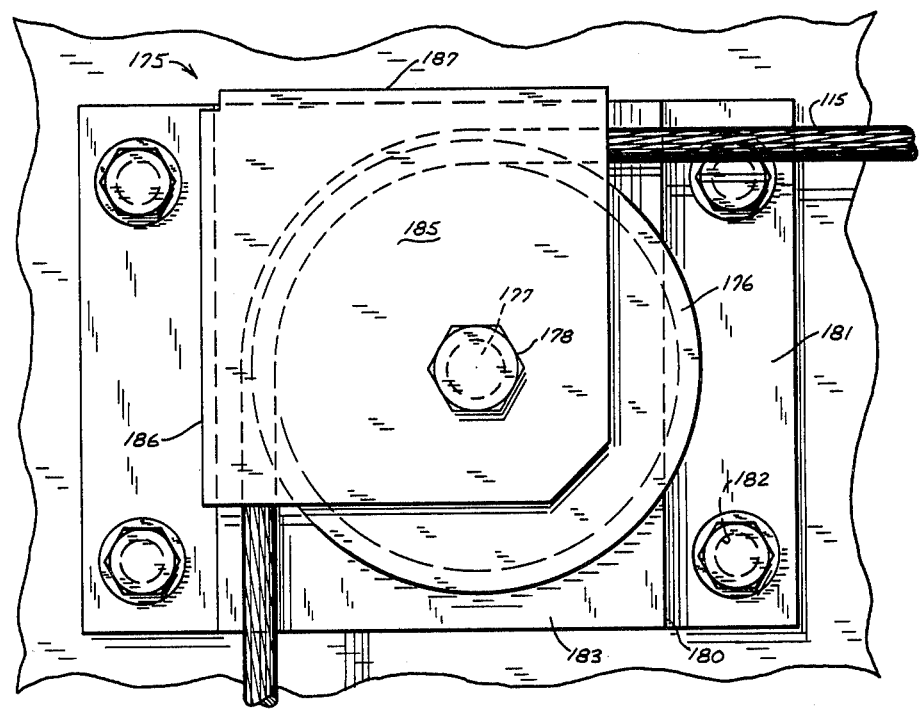
FIG. 10 is a plan view of a corner pulley taken along line 10—10 of FIG. 9.
Figure 9:
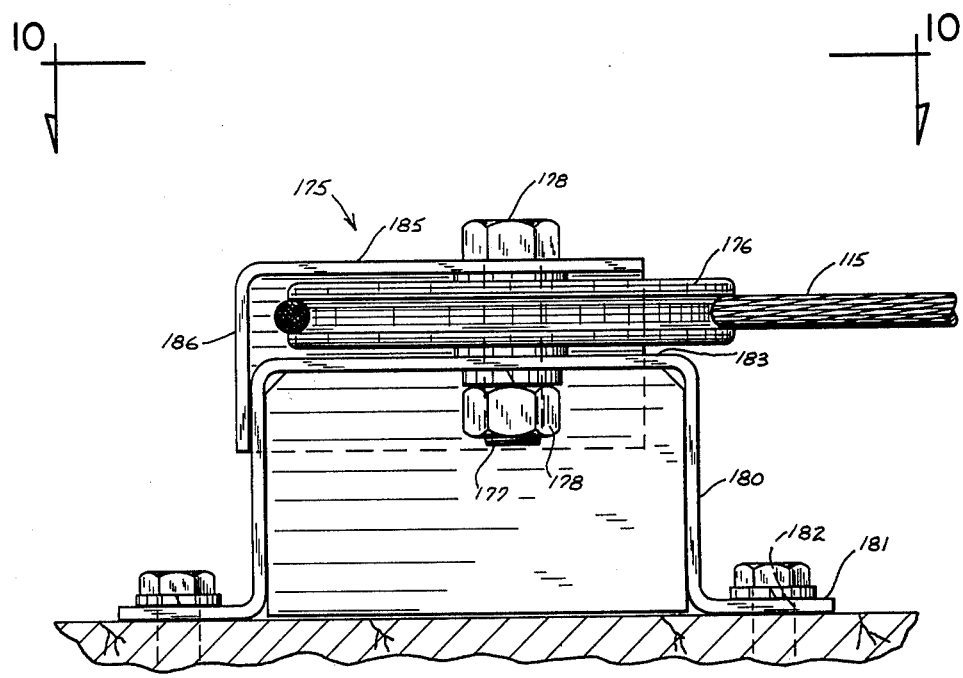
FIG. 9 is an elevational view of a corner pulley taken along line 9—9 of FIG. 1.

With reference to FIGS. 9 and 10, the corner pulleys 175 are comprised of a base 180 supporting a pulley 176 between the top portion 183 of base 180 and a top flange 185 which is secured to base 180 by corner walls 186, 187. A bearing shaft 177 axially supports the pulley 176 for rotational movement between top flange 185 and the top portion 183. The shaft 177 is received within suitable apertures (not shown) in the flange 185 and top 183 and is secured within said apertures by nuts 178 threadably received on the ends of shaft 177. The base 180 has feet 181 horizontally dispoed at its lower ends, the feet 181 having apertures 182 for securely fastening the pulley 175 to a concrete slab or other supporting surface. The base 180 and associated assembly, as shown in FIG. 9, position the pulley in a horizontal plane at the proper height to maintain cable 115 in a substantial horizontal orientation throughout the system. By so doing, the cable 115 does not tend to be pulled out of, or climb out of, the pulley grooves. The corner pulley 175, in addition, provides a solid and secure base for the pulley wheel 176, and includes a cable shield comprised of the enclosed region defined by top 183, flange 185, and corner walls 186, 187, to retain cable 115 in the pulley block 175 at all times.

It can, thus, be appreciated from the foregoing description that the drive unit 120, linked to control system 200, can move the novel scraper assembly 5 forwardly and rearwardly in the collection alley 1 to periodically, and automatically, convey any accumulated manure to the end of the alley, with the tension control means 150 providing for a continuous positive tension in the cable, and the pulley blocks 175 providing a substantially horizontal course for the cable 115 through the various elements.

While only one collection alley 1 is disclosed in FIG. 1, the system disclosed could be employed for any number of alleys by modifying the cable course and providing a scraper assembly for each alley.

Figure 11:
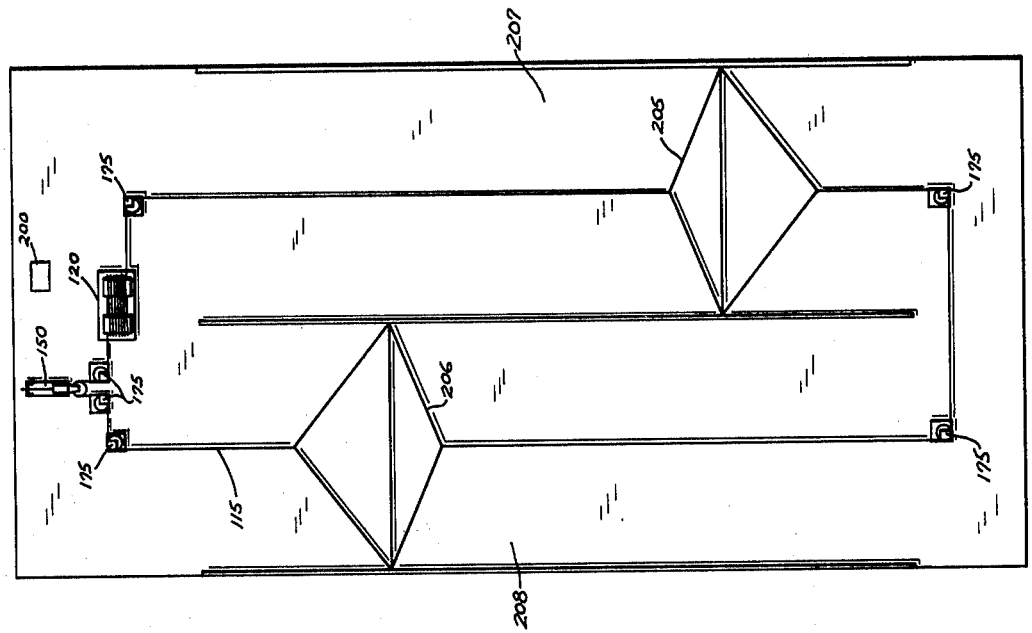
FIG. 11 is a symbolic plan view of the present conveyor system used for a livestock confinement unit having two manure collection alleys.

FIG. 11 shows a two alley conveyor system having a scraper assembly 205 in alley 207 and a scraper assembly 206 in alley 208. In this system, scraper 205 and scraper 206 move simultaneously but in opposite directions. Scraper 205 conveys manure down the alley 207, with reference to FIG. 11, while scraper 206 conveys manure up alley 208. Manure trenches (not shown) are positioned along both ends of the alleys. Due to the simultaneous movement of the blades only one pair of forward and rearward sensors is required to control the system and they could be placed in any alley. In all other respects such as the use of a timing control mechanism (not shown) and the operations of the scraper assemblies, drive unit 120 and tensioning means 150 the system works identically.

Figure 12:
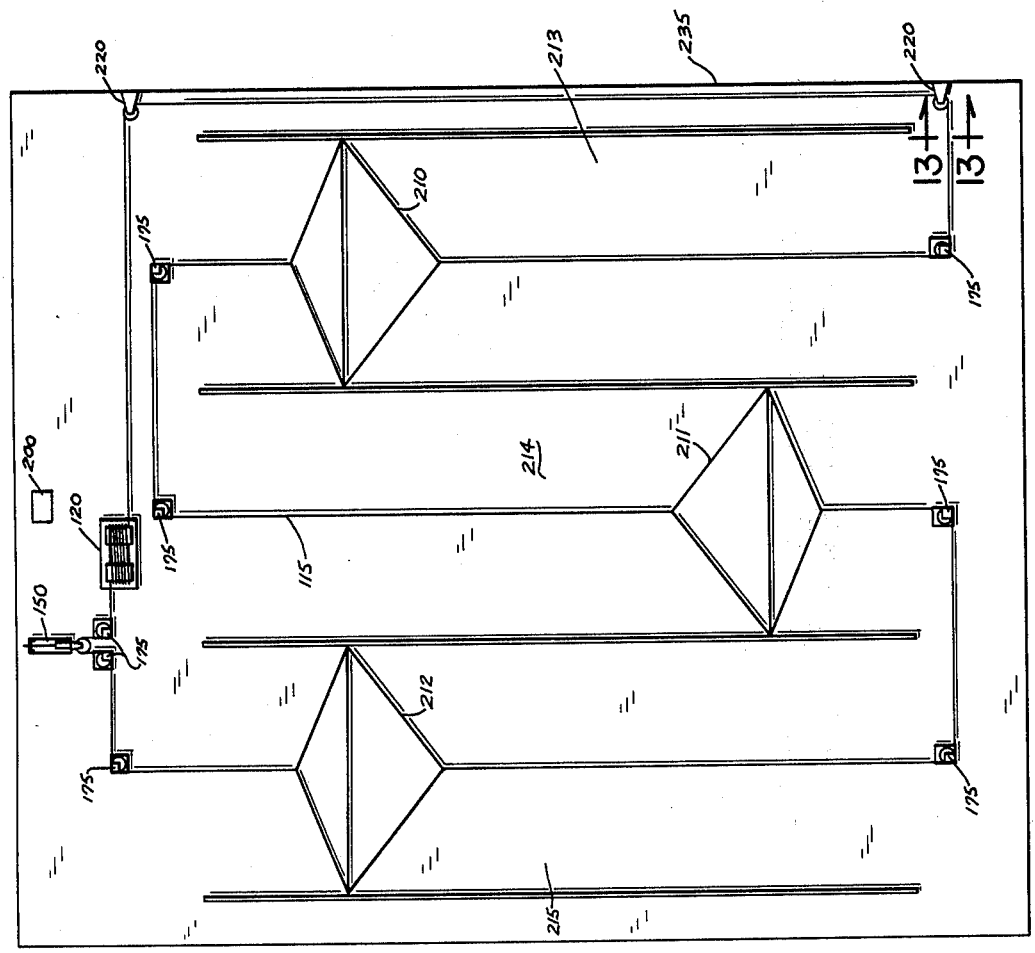
FIG. 12 is a symbolic plan view of the present conveyor system used for a livestock confinement unit having three manure collection alleys.
Figure 14:
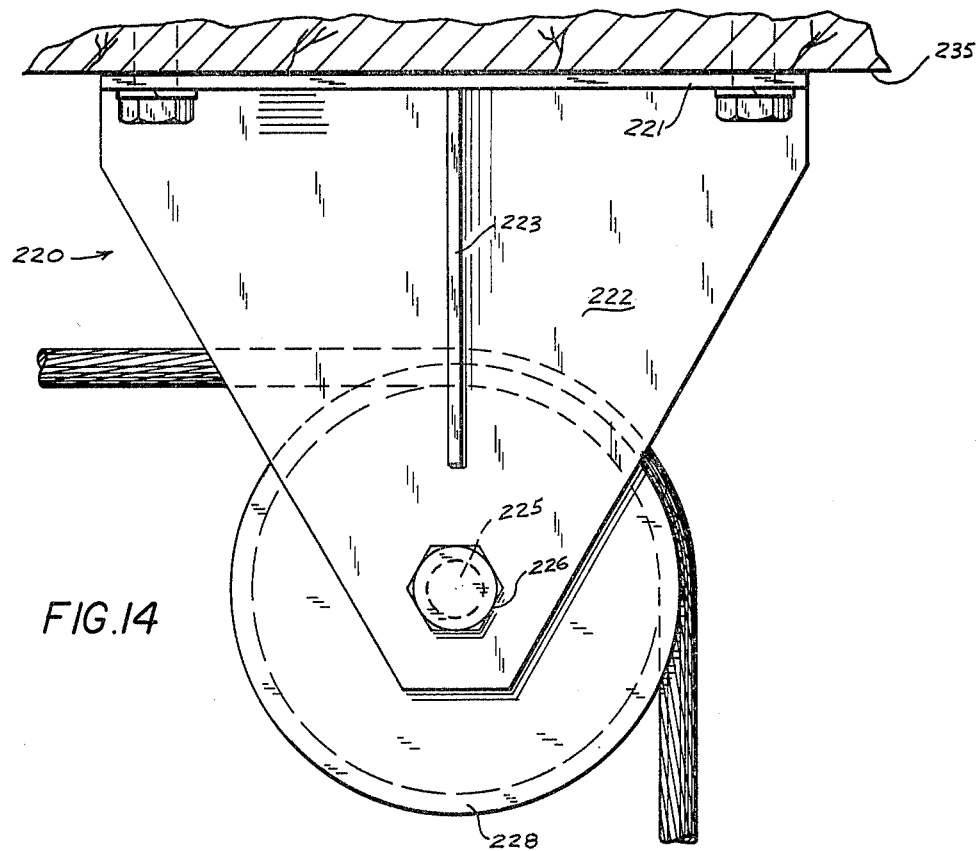
FIG. 14 is a plan view of a wall pulley taken along line 14—14 of FIG. 13.
Figure 13:
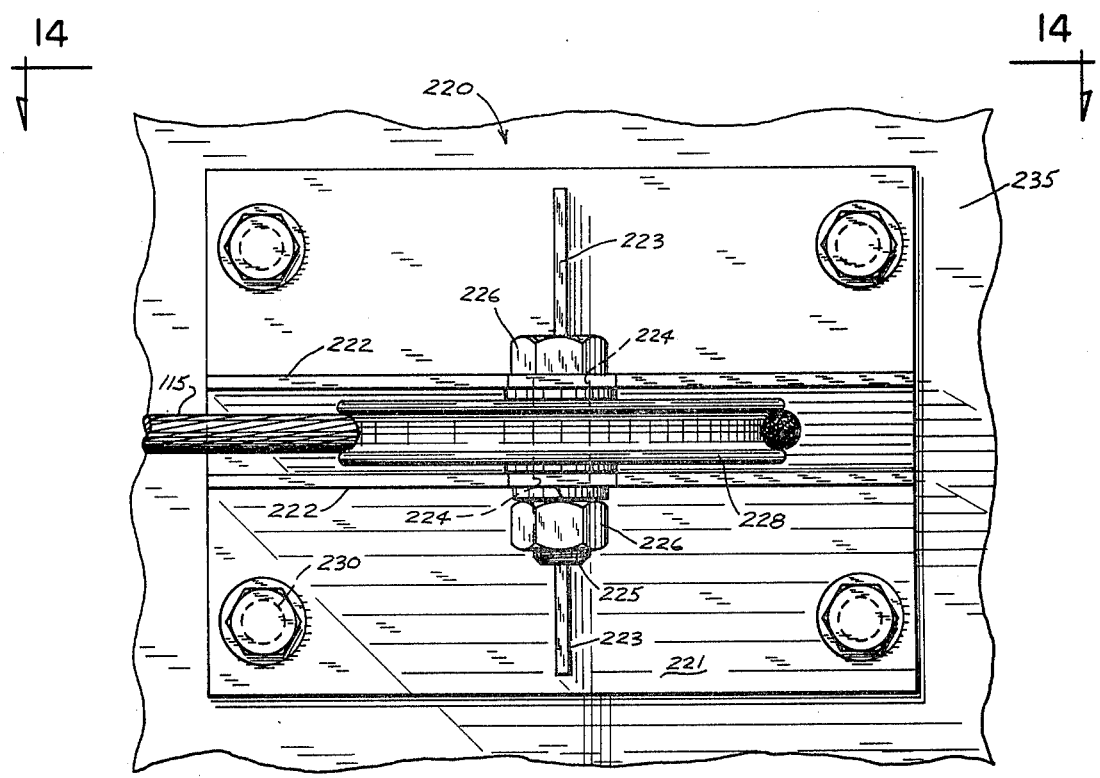
FIG. 13 is an elevational view of a wall pulley taken along line 13—13 of FIG. 12.

FIG. 12 shows a three alley conveyor system. Here, with reference to FIG. 12, scrapers 210 and 212 simultaneously convey manure down alleys 213,215, respectively; while scraper 211 simultaneously conveys manure up alley 214. Again, there are manure trenches (not shown) at both ends of the alleys 213, 214, 215 to receive the manure for disposal. Only one pair of forward and rearward sensors is required to control the system. The drive unit 120, tensioning device 150, and scraper assemblies work in the same way as hereinbefore described. The three alley system of FIG. 11 employs an alternative pulley design, wall pulley 220, best shown in FIGS. 13, 14.

Wall pulley 220 is comprised of a mounting plate 221 having a pair of normally disposed, substantially triangular flanges 222, secured by gussets 223. The flanges 222 include aligned apertures 224 within which bearing pin 225 is secured by nuts 226 to axially secure pulley 228 for rotational movement. Wall pulley 220 can be mounted at the desired height upon a wall 235 by means of apertures 230. Wall pulley 220 permits a cable course to be routed along any available walls or other suitable elevated vertical supports. Corner pulleys 175, on the other hand, are securable upon horizontal surfaces such as a concrete pad. Thus, the alternative pulley designs 175, 220 permit a cable course to be routed by means of both the available horizontal and vertical supports providing added flexibility to the instant invention. Having, thus, disclosed the present invention it is obvious that modifications and variations are possible in light of its teachings. It is therefore intended to be understood that, within the scope of the appended claims, the invention may be practiced otherwise than as specifically described.

I claim:

1. A conveyor apparatus for removing manure from a building having one or more collection alleys, and a reversible driving means operably connected to a cable, said conveyor apparatus comprising:

a. a scraper blade;
b. runner means having a pivotal connection with said scraper blade;
c. a first stabilizer strut attached to said runner means;
d. a first guide means attached to said first stabilizer strut;
e. a second stabilizer strut connected to said runner means;
f. a second guide means connected to said second stabilizer strut; and
g. a drive linkage assembly, said drive linkage assembly including a first slide portion, a second slide portion, and a link means; said link means being pivotally attached to said scraper blade; said first slide portion being attached to said link means and movably connected to said first guide means; said second slide portion being attached to said link means and being movably connected to said second guide means, said drive linkage assembly including a first means for limiting the travel of said first slide portion with respect to said first guide means and further including a second means for limiting the travel of said second slide portion with respect to said second guide means; said drive linkage assembly being connected at a front end and a rear end to said cable such that when said reversible driving means moves said cable in a forward direction, said link means pivots said scraper blade downward to an operating position and said first and second travel limiting means apply forward forces to said first and second guide means, respectively, such that said scraper blade moves in said forward direction; and such that when said reversible driving means moves said cable means in a rearward direction, said link means pivots said scraper blade upward to a resting position, and said first and second travel limiting means applies a rearward force to said first and second guide means, respectively, such that said scraper blade is moved in said rearward direction.

2. The conveyor apparatus of claim 1, wherein said first stabilizer strut is a front stabilizer strut, said first guide means is a front guide means, and said first slide portion is a front slide portion; and wherein said second stabilizer strut is a rear stabilizer strut, said second guide means is a rear guide means, and said second slide portion is a rear slide portion.

3. The conveyor apparatus of claim 2, wherein said runner means comprises a pair of shoes, a transverse axis shaft being connected between said shoes, said scraper blade being connected to said transverse shaft such that said scraper blade is moveable pivotally with respect to said shoes; said scraper blade extending transversely across said collection alley, said cable having a course extending lengthwise along said collection alley, said scraper blade being moveable lengthwise in either said forward direction or said rearward direction along said collection alley by said cable.

4. The conveyor apparatus of claim 3, wherein said link means of said drive linkage assembly comprises a front link and a rear link, said front link extending from said front slide portion to said scraper blade, said rear link extending from said scraper blade to said rear slide portion, said front link being in pivotal connection with said scraper blade, said rear link being in pivotal connection with said scraper blade, said front link being in pivotal connection with said rear link.

5. A conveyor apparatus for removing manure from a building having one or more collection alleys, and a reversible driving means operably connected to a cable, said conveyor apparatus comprising:
 a. a scraper blade;
 b. runner means having a pivotal connection with said scraper blade;
 c. a first stabilizer strut attached to said runner means;
 d. a first guide means attached to said first stabilizer strut; and
 e. a drive linkage assembly, said drive linkage assembly including a first slide portion and a link means; said link means being pivotally attached to said scraper blade; said first slide portion being attached to said link means and movably connected to said first guide means, said drive linkage assembly including a first threaded shaft and said link means including a first collar at one end thereof, said first slide portion having a hollow interior; said first threaded shaft extending through said first slide portion, said first slide portion extending through said first collar, said first slide portion being rigidly secured to said first collar, said first slide portion including a front stop means at one end and a rear stop means at the other end opposite thereto, said first guide means having a hollow interior and said first slide portion being movably disposed within said hollow interior such that said first slide portion is movable within said guide means between said front stop means and said rear stop means thereby comprising a first means for limiting the travel of said first slide portion with respect to said first guide means; said drive linkage assembly being connected at a front end and a rear end to said cable such that when said reversible driving means moves said cable in a forward direction, said link means pivots said scraper blade downward to an operating position and said first travel limiting means applies a forward force to said first guide means such that said scraper blade moves in said forward direction; and such that when said reversible driving means moves said cable means in a rearward direction, said link means pivots said scraper blade upward to a resting position, and said first travel limiting means applies a rearward force to said first guide means such that said scraper blade is moved in said rearward direction.

6. A conveyor apparatus for removing manure from a building having one or more collection alleys, and a reversible driving means operably connected to a cable, said conveyor apparatus comprising:
 a. a scraper blade;
 b. runner means having a pivotal connection with said scraper blade;
 c. a first stabilizer strut attached to said runner means;
 d. a first guide means attached to said first stabilizer strut and;
 e. a drive linkage assembly, said drive linkage assembly including a first slide portion and a link means; said link means being pivotally attached to said scraper blade; said first slide portion being attached to said link means and movably connected to said first guide means, and said drive linkage assembly including a first means for limiting the travel of said first slide portion with respect to said first guide member; said drive linkage assembly being connected at a front end and a rear end to said cable such that when said reversible driving means moves said cable in a forward direction, said link means pivots said scraper blade downward to an operating position and said first travel limiting means applies a forward force to said first guide means such that said scraper blade moves in said forward direction; and such that when said reversible driving means moves said cable means in a rearward direction, said link means pivots said scraper blade upward to a resting position, and said first travel limiting means applies a rearward force to said first guide means such that said scraper blade is moved in said rearward direction; including means for providing continuous tension to said cable, said tensioning means comprising a tensioning pulley, a tensioning sleeve spring means, a tensioning shaft and shaft securing means; said cable being threaded through said tensioning pulley and said tensioning sleeve having a spring bearing surface disposed at a rearward end opposite thereto, said spring bearing surface being enclosed within said tensioning sleeve and having an aperture, said tensioning shaft being slideably received within said aperture and having one broad end, said spring encircling said tensioning shaft and being held in compression between said broad end and said bearing surface, said tensioning shaft having a secured end, said secured end being rigidly secured to said shaft securing means, said shaft securing means being rigidly secured to a base member, said tensioning sleeve including a slide member, said slide member being disposed in a slide channel provided in said base member, said slide member movably mounting said tensions sleeve upon said base member; said compressed spring exerting a force upon said bearing surface biasing said movable tensioning sleeve rearwardly, said force being transmitted through said tensioning sleeve to said tensioning pulley whereby said tensioning pulley exerts said force upon said cable, said force comprising a tensioning force on said cable.

7. The conveyor apparatus of claim 6, wherein said tensioning means includes a means for adjusting and indicating said tensioning force, said adjustment and indicating means comprising a calibrated scale a pointer, and a means for adjustably positioning said tensioning shaft with respect to said shaft securing means; said pointer having an indicator end disposed cooperatively with said calibrated scale and opposite thereto a secured end secured to said tensioning shaft, said tensioning shaft adjustment means permitting said tensioning shaft to be adjusted translationally with respect to said shaft securing means whereby as said shaft is moved translationally, said indicator end moves translationally across said calibrated scale and indicates the tensioning force created by said spring.

8. A conveyor apparatus for removing manure from a building having one or more collection alleys, and a reversible driving means operably connected to a cable, said conveyor apparatus comprising:
 a. a scraper blade;
 b. runner means having a pivotal connection with said scraper blade;
 c. a first stabilizer strut attached to said runner means;
 d. a first guide means attached to said first stabilizer strut; and
 e. a drive linkage assembly, said drive linkage assembly including a first slide portion and a link means; said link means being pivotally attached to said scraper blade; said first slide portion being attached to said link means and movably connected to said first guide means, and said drive linkage assembly including a first means for limiting the travel of said first slide portion with respect to said first guide means; said drive linkage assembly being connected at a front end and a rear end to said cable such that when said reversible driving means moves said cable in a forward direction, said link means pivots said scraper blade downward to an operating position and said first travel limiting means applies a forward force to said first guide means such that said scraper blade moves in said forward direction; and such that when said reversible driving means moves said cable means in a rearward direction, said link means pivots said scraper blade upward to a resting position, and said first travel limiting means applies a rearward force to said first guide means such that said scraper blade is moved in said rearward direction; wherein said reversible driving means comprises a reversible motor, a gearbox, a torque limiting clutch, an idler spool, and a drive spool; said reversible motor being in operable connection with an input member of said gear box, said gear box having an output member and said torque limiting clutch being co-operatively connected to said output member, a first sprocket being coupled with said torque limiting clutch, said idler spool being axially supported by a shaft/clutch, a second sprocket being disposed at a first end of said shaft/clutch, said second sprocket being operatively connected to said first sprocket by means of a first endless chain, said shaft/clutch having a third sprocket at a second end, said drive spool being axially supported by a shaft and having a fourth sprocket at a first end of said shaft, said third sprocket being operably connected to said fourth sprocket by means of a second endless chain, said idler spool and said drive spool having a plurality of grooves, said cable encircling said spools, said cable being wrapped from one of said spools to the other, said cable lying within said grooves such that said grooves provide a high frictional contact gripping force on said cable, said cable extending from a front end of said drive linkage assembly to said drive spool and around said spools as aforesaid, said cable extending from said idler spool to a rear end of said drive linkage assembly, said shaft/clutch being rotationally supported by bearings at its ends, said shaft being rotationally supported by bearings at its ends, said shaft/clutch being operably connected to a clockwise forward clutch at said first end, and to a counterclockwise rearward clutch at said second end, said clockwise forward clutch engaging only when said shaft/clutch is rotated clockwise, said counterclockwise rearward clutch engaging only when said shaft/clutch is rotated counterclockwise, such that when said motor, by means of said gearbox, causes said shaft/clutch to rotate clockwise, said clockwise forward clutch engages said third sprocket to drive said fourth sprocket, said fourth sprocket in turn driving said drive spool clockwise whereby said cable is wrapped in a clockwise direction about said spools thereby moving said scraper blade in said forward direction; and such that when said motor reverses and moves said shaft/clutch in a counterclockwise direction, said counterclockwise rearward clutch engages at said first end of said shaft/clutch to rotate said idler spool counterclockwise whereby said cable is wrapped in a counterclockwise direction about said spools and said scraper blade is moved in said rearward direction.

9. The conveyor apparatus of claim 8 wherein said reversible drive means is controlled by an electrical control mechanism, said electrical control mechanism having a timer, a forward sensor and a rearward sensor, said timer being adjustable; said forward sensor being located forward of said collection alley and being contacted when said conveyor apparatus is moved to the front of said collection alley, said forward sensor then signaling said control mechanism to stop and reverse said motor; said rearward sensor being located rearward of said collection alley, said rearward sensor being contacted when said conveyor apparatus is moved to the rear of said collection alley, said rearward sensor then signaling said control mechanism to stop said motor, and restart said timer, said timer signaling said control mechanism to start up said motor to move said conveyor apparatus forward after a set period of time.

10. A conveyor apparatus for removing manure from a building having one or more collection alleys, and a reversible driving means operably connected to a cable, said conveyor apparatus comprising:
 a. a scraper blade;
 b. runner means having a pivotal connection with said scraper blade;
 c. a first stabilizer strut attached to said runner means;
 d. a first guide means attached to said first stabilizer strut; and
 e. a drive linkage assembly, said drive linkage assembly including a first slide portion and a link means; said link means being pivotally attached to said scraper blade; said first slide portion being attached to said link means and movably connected to said first guide means, and said drive linkage assembly including a first means for limiting the travel of said first slide portion with respect to said first guide means; said drive linkage assembly being connected at a front end and a rear end to said cable such that when said reversible driving means moves said cable in a forward direction, said link means pivots said scraper blade downward to an operating position and said first travel limiting means applies a forward force to said first guide means such that said scraper blade moves in said forward direction; and such that when said reversible driving means moves said cable means in a rearward direction, said link means pivots said scraper blade upward to a resting position, and said first travel limiting means applies a rearward force to said first guide means such that said scraper blade is moved in said rearward directions; and wherein said cable is routed through a plurality of pulley blocks, each of said pulley blocks rotationally supporting a pulley, said pulley blocks being secured to a horizontal surface and positioning said pulleys at a height suitable to maintain a substantially horizontal cable course.

11. A conveyor apparatus for removing manure from a building having one or more collection alleys, and a reversible driving means operably connected to a cable, said conveyor apparatus comprising:
 a. a scraper blade;

b. runner means having a pivotal connection with said scraper blade;

c. a first stabilizer strut attached to said runner means;

d. a first guide means attached to said first stabilizer strut; and e. a drive linkage assembly, said drive linkage assembly including a first slide portion and a link means; said link means being pivotally attached to said scraper blade; said first slide portion being attached to said link means and movably connected to said first guide means, and said drive linkage assembly including a first means for limiting the travel of said first slide portion with respect to said first guide means; said drive linkage assembly being connected at a front end and a rear end to said cable such that when said reversible driving means moves said cable in a forward direction, said link means pivots said scraper blade downward to an operating position and said first travel limiting means applies a forward force to said first guide means such that said scraper blade moves in said forward direction; and such that when a said reversible driving means moves said cable means in a rearward direction, said link means pivots said scraper blade upward to a resting position, and said first travel limiting means applies a rearward force to said first guide means such that said scraper blade is moved in said rearward direction; and wherein said drive linkage is pivotally secured to said scraper blade at an offset point, said offset point not being in alignment with the center of the scraper blade, said offset securement causing said blade to waiver as said blade moves forwardly in said collection alley, said waivering movement effecting a more even distribution of manure across said blade.

12. A conveyor apparatus for removing manure from a building having one or more collection alleys, and a reversible driving means operably connected to a cable, said conveyor apparatus comprising:

a. a scraper blade;

b. runner means having a pivotal connection with said scraper blade;

c. a first stabilizer strut attached to said runner means;

d. a first guide means attached to said first stabilizer strut, wherein said first stabilizer strut is downwardly directed from said runner means to said first guide means, said downward orientation applying a downward force to said scraper blade; and e. a drive linkage assembly, said drive linkage assembly including a first slide portion and a link means; said link means being pivotally attached to said scraper blade; said first slide portion being attached to said link means and movably connected to said first guide means, and said drive linkage assembly including a first means for limiting the travel of said first slide portion with respect to said first guide means; said drive linkage assembly being connected to a front end and a rear end to said cable such that when said reversible driving means moves said cable in a forward direction, said link means pivots said scraper blade downward to an operating position and said first travel limiting means applies a forward force to said first guide means such that said scraper blade moves in said forward direction; and such that when said reversible driving means moves said cable means in a rearward direction, said link means pivots said scraper blade upward to a resting position, and said first travel limiting means applies a rearward force to said first guide means such that said scraper blade is moved in said rearward direction.

* * * * *